United States Patent

[11] 3,601,021

| [72] | Inventor | Donald Oscar Easterly<br>Rochester, N.Y. |
|---|---|---|
| [21] | Appl. No. | 746,615 |
| [22] | Filed | July 22, 1968 |
| [45] | Patented | Aug. 24, 1971 |
| [73] | Assignee | Eastman Kodak Company<br>Rochester, N.Y. |

[54] CAMERA EXPOSURE CONTROL
9 Claims, 3 Drawing Figs.

[52] U.S. Cl. .................................................. 95/10 C,
95/31, 95/64, 352/72
[51] Int. Cl. ........................................................ G03b 7/18,
G03b 11/00, G03b 17/26
[50] Field of Search............................................. 95/10 C,
11, 31, 64; 352/72, 78, 141

[56] References Cited
UNITED STATES PATENTS
| 3,208,363 | 9/1965 | Easterly et al. ............... | 95/11 |
| 3,425,326 | 2/1969 | Wasielewski ................. | 95/31 X |
| 3,312,158 | 4/1967 | MacMillin et al............. | 95/10 C |
| 3,314,344 | 4/1967 | Anwyl et al................... | 95/10 C |
| 3,444,798 | 5/1969 | Mayr et al..................... | 95/10 C X |

*Primary Examiner*—Samuel S. Matthews
*Assistant Examiner*—Joseph F. Peters, Jr.
*Attorneys*—Robert W. Hampton and Daniel E. Sragow

ABSTRACT: An exposure control system in a camera adapted to receive a film cartridge having tactile indicia representative of film speed and film type, including movable filters for varying the intensity and color balance of light incident on a photocell in the system in response to detected tactile indicia. The system also includes movable filters for varying the intensity and color balance of light transmitted through the objective of the camera in response to the detected film type indicia, and independent control means for removing the color balance filters away from the photocell and the objective.

Patented Aug. 24, 1971

DONALD O. EASTERLY
INVENTOR

BY

ATTORNEY

Patented Aug. 24, 1971

DONALD O. EASTERLY
INVENTOR

ATTORNEYS

Patented Aug. 24, 1971

DONALD O. EASTERLY
INVENTOR

ATTORNEYS

CAMERA EXPOSURE CONTROL

BACKGROUND OF THE INVENTION

The present invention relates to cameras of the type having automatic exposure control systems and means for receiving film cartridges having notch encoding thereon indicative of film sensitivity and film type. More particularly the invention relates to camera mechanism for detecting such encoding and automatically varying exposure parameters of the camera in accordance with the information furnished by such encoding.

It is well known that color and black and white film for cartridge loading cameras is now available in a variety of film speeds. Furthermore, it is known that most color films are available in two basically different spectral sensitivities, namely, "daylight" and "artificial light" which are color balanced for exposure in sunlight and photoflood illumination, respectively Generally, artificial light balanced (Type A) color films have a film speed approximately one f/stop faster than the equivalent daylight balanced films.

Many cartridge loading cameras having automatic exposure control systems are provided with a light balancing lens filter which, when placed in optical alignment with the picture taking lens, produces proper exposure of Type A film in sunlight. This filter is commonly referred to as a Type A lens filter. In addition to effectively changing the spectral characteristics (i.e., color temperature) of sunlight to artificial light (e.g. photoflood), the Type A lens filter attenuates light passing through the picture taking lens to an extent that the effective lens aperture is reduced by approximately one f/stop. This reduction in lens speed permits the exposure parameters of Type A and daylight film to be identical when both are exposed in sunlight.

Since the speed of Type A film is effectively one f/stop slower when exposed in sunlight through a Type A lens filter, it is common to provide cameras incorporating such filters with a means for compensating the output of the exposure control system accordingly. Such means often comprises a neutral density filter placed in optical alignment with the photocell which controls the automatic exposure control system. Such cameras also include photocell filters which compensate for different film sensitivities. In many cameras this Type A photocell compensating filter also functions as an integral part of the compensating system used for varying photocell sensitivity in accordance with various film speeds. In its later role, the Type A photocell compensating filter is usually removed only when daylight film of the maximum speed for which the exposure control system was designed is used or when Type A film is to be exposed indoors to artificial illumination since daylight film is usually one f/stop slower than Type A film. In both cases removal of the filter has heretofore been accomplished by inserting an artificial light attachment (or key, when a remote light source is used) in a camera receptacle having means therein for displacing such filter. When using maximum speed daylight film outdoors, insertion of an artificial light key may be overlooked and improperly exposed film is a likely result.

SUMMARY OF THE INVENTION

The instant invention eliminates the aforementioned necessity of inserting an artificial light key when maximum speed daylight film is used in a camera. Removal of the Type A photocell compensating filter is accomplished automatically in accordance with the coding on cartridges which indicate the sensitivity of the film contained therein. Generally, film cartridges are coded as to film sensitivity by notching. One code notch varies in length between cartridges depending on the speed of the film therein. The presence or absence of a second code notch is indicative of spectral sensitivity, the presence or absence being indicative of Type A or daylight film respectively. In accordance with a preferred embodiment of this invention, means are provided in a camera for interacting with the film speed code notch on a film cartridge so as to automatically remove the Type A photocell compensating filter whenever daylight film of the maximum speed accommodatable by the camera is used, thereby obviating the necessity of inserting an artificial light attachment or key. In accordance with another embodiments, means are provided in a camera for interacting with the spectral sensitivity code notch on a film cartridge so as to remove the Type A photocell compensating filter whenever the cartridge is notched for daylight film of one of two film speeds.

BRIEF DESCRIPTION OF THE DRAWING

These and other objects of the invention will become immediately apparent to those skilled in the art from a reading of the ensuing description, reference being made to the accompanying drawings wherein:

Referring now to FIG. 1, an exposure control attenuation system having incorporated therein an embodiment of the present invention is shown in combination with a picture taking lens 10 and a photosensitive element or photocell 11, the latter being an integral part of a conventional exposure control system which varies either the aperture size of taking lens 10 of the shutter speed provided by the camera in accordance with the magnitude of scene luminance. Photocell 11 is illuminated, in a conventional manner, by light passing through light pipe 9. The attenuation system depicted is designed to vary photocell sensitivity in accordance with the notch coding of film cartridge 12, the cartridge having aperture 13 therein through which film may be exposed by light passing through taking lens 10. The film cartridge is further provided with a first notch 14 having a length indicative of the A.S.A. (American Standards Association) film speed of the film therein and is adapted to receive a second optional notch 15, the presence or absence of which is indicative of the color balance (Type A or daylight) of the film therein. The attenuation system shown in FIG. 1 is of a type adapted to accommodate cartridges having three different codings for film speed of daylight film and two different codings for film speed of Type A film. It is to be understood that the system could be adapted to accommodate more codings within the scope of the invention.

Figure 1:
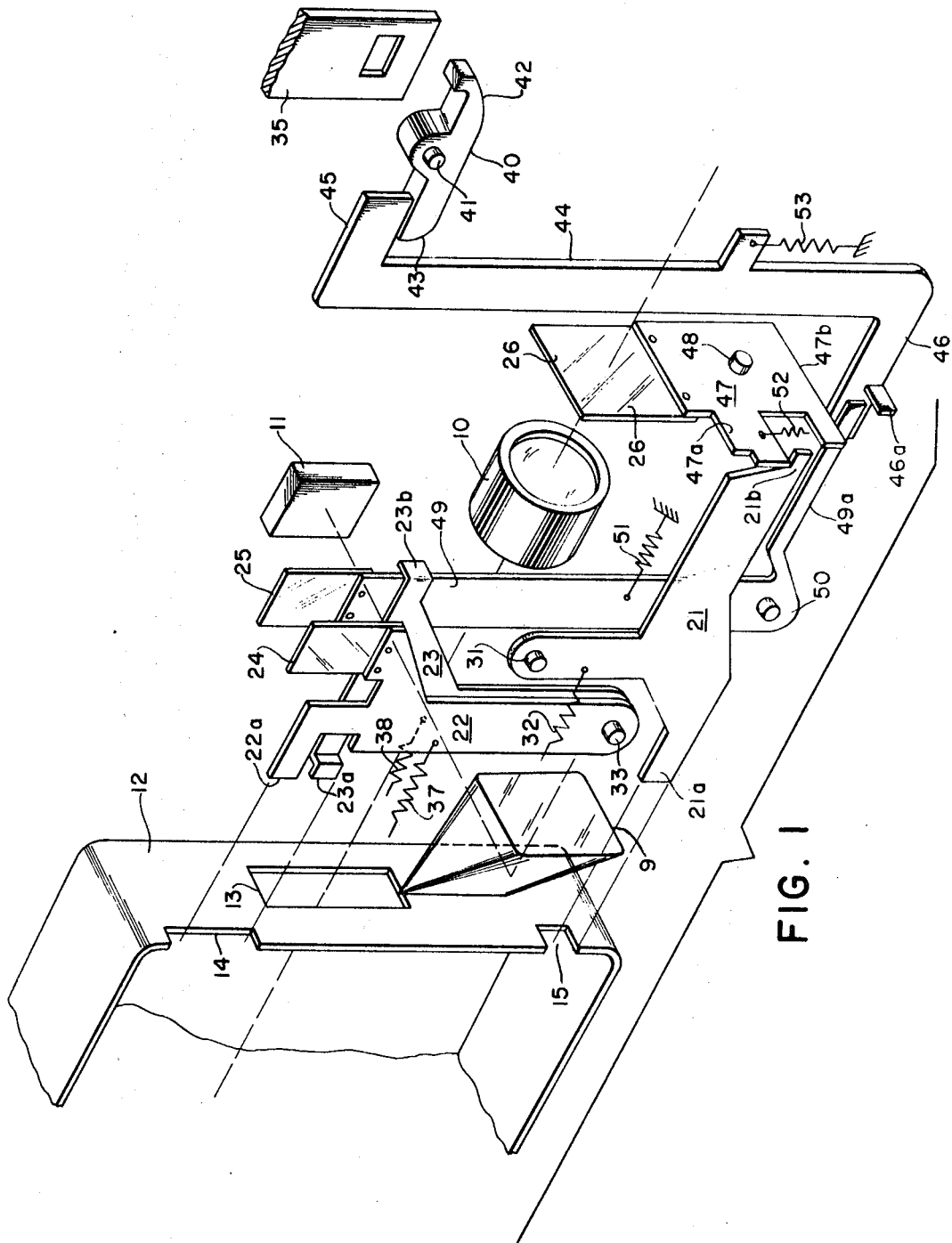
FIG. 1 is an elevational perspective view showing the major elements comprising one embodiment of the invention.

Basically, the system is comprised of the following elements: (a) a Type A notch sensor 21 which cooperates with cartridge notch 15 for varying the position of the Type A lens filter 26; (b) a pair of film speed notch sensors 22 and 23 which cooperate with notch 14 of the film cartridge for varying the position of the photocell compensating filters 24 and 25; and (c) means actuatable by an artificial light key 35 for simultaneously varying the position of the Type A lens filter 26 and the Type A photocell compensating filter 25 when both are in optical alignment with the lens 10 and photocell 11, respectively. As will become apparent, photocell compensating filter 24 functions solely as a means to vary photocell sensitivity in accordance with film speed, whereas Type A photocell compensating filter 25 functions dually as a means to vary photocell sensitivity in accordance with film speed and as a means to reduce photocell sensitivity whenever the Type A filter 26 is employed. Functioning as a part of the film speed compensating system, filter 25 is the last compensator to be removed before the photocell operates at maximum sensitivity.

Type A notch sensor 21 is pivotally mounted on the camera housing (not shown) on shaft 31; spring 32 is provided for biasing the notch sensor 21 in a clockwise direction. Stop means (not shown) are provided for preventing a clockwise movement of notch sensor 21 beyond its position shown in FIG. 1. Notch sensor 21 is operably connected with filter mount 47 by means of the engagement between arms 21b and 47a of notch sensor 21 and filter mount 47, respectively. Notch sensor 21 is further provided with feeler member 21a which is adapted to cooperate with notch 15 so as to engage the latter when cartridge 12 contains Type A film and thereby permit notch sensor 21 to remain in the position shown. Filter 26 is rigidly mounted on filter mount 47; the latter is pivotally mounted on shaft 48 to the camera housing. Spring 52 serves to bias filter mount 47 in a counterclockwise direction about shaft 48. Due to the engagement of arm 47a with arm 21b of notch sensor 21, filter 26 is normally positioned in optical alignment with lens 10 prior to insertion of cartridge 12 in the camera.

Both film speed notch sensors 22 and 23 are pivotally mounted to the camera housing on shaft 33 and are biased to rotate in a counterclockwise direction by springs 37 and 38, respectively. Stop means (not shown) are provided for preventing a further counterclockwise movement than shown. Both filters 24 and 25 are normally out of optical alignment with photocell 11 prior to insertion of cartridge 12 in the camera. NOtch sensor 22 has integrally connected therewith the film speed photocell compensating filter 24 and is provided with a notch feeler member 22a which is adapted to cooperate with the film speed cartridge notch 14 so as to move filter 24 into and out of optical alignment with photocell 11 in accordance with film speed. Notch sensor 23 is operably connected with the secondary photocell compensating filter 25 by means of the engagement between filter mount 49 and lug 23b. Filter mount 49 is also pivotally mounted to the camera housing on shaft 50 and is biased to rotate in a clockwise direction toward lug 23b by spring 51. Notch sensor 23 is further provided with a notch feeler member 23 a which is adapted to cooperate with film speed notch 14 for moving filter 25 into and out of optical alignment with photocell 11 in a accordance with film speed.

Whenever Type A film is contained by cartridge 12, filters 25 and 26 will normally be positioned in alignment with photocell 11 and lens 10, respectively, This positioning is accomplished by means to be described hereinafter. Thus, the camera is ordinarily set for exposing Type A film in sunlight. However, whenever it is desired to exposed Type A film to artificial light, it becomes necessary to remove both filters, 25 and 26. Means for simultaneously removing these filters comprises lever 40, vertical member 44, and filter mounts 47 and 49. Lever 40 is pivotally mounted to the camera housing on shaft 41 and has a first end portion 42 in position for engagement with key 35 when the latter is inserted in a receptacle in the camera designed for receiving an artificial light attachment, and a second end portion 43 which is operably connected to the filter mounts 47 and 49 by means of member 44. Member 44 is biased in a downward direction by spring 53 and is provided with upper and lower parallel arms, 45 and 46, respectively. Lower parallel arm 46 of member 44 is arranged so as to engage the base portion 47b of filter mount 47 and move the latter in a clockwise direction about shaft 48 when member 44 is caused to move in an upward direction. Lower parallel arm 46 is provided with a perpendicularly extending lug 46a which is arranged to engage arm 49a of filter mount 49 and move the latter in a counterclockwise direction about shaft 50 when member 44 is caused to move in an upward direction. Note that filter holder 49 is shown in a position whereby filter 25 is initially out of alignment with photocell 11. The arrangement just described presumes the presence of filter 25 in alignment with photocell 11, in which case arm 49a is moved in a downward direction to engage lug 46a. Thus, as key 35 is inserted, thereby causing member 44 to move upward, both filters, 25 and 26, are tipped out of alignment.

As aforementioned, the system shown in FIG. 1 is designed to automatically vary photocell sensitivity for three different cartridge codings for film speeds of daylight film (e.g. A.S.A. film speeds of 25, 100, and 160) and two different film speeds of Type A film (e.g. A.S.A. film speeds of 40 and 160). Assuming the system is designed to accommodate the above suggested film speeds, the system operates in the manner hereinafter described. It is to be understood, however, that the film speeds discussed here are merely exemplary. The invention is not to be limited to the limited capacity described, nor to the specific film speeds for which the examples are described.

When cartridge 12 is coded for A.S.A. 160 daylight film (this being the maximum speed of daylight balanced film accommodatable by the exposure control system shown), cartridge film speed notch 14 will be of a length such that both film speed notch feeler members 22a and 23a may enter therein and thereby permit the mechanism to remain in the position as shown, i.e. with both photocell compensating filters 24 and 25 out of optical alignment with photocell 11. In this position the photometric system is operating at its maximum design sensitivity. The absence of notch 15 in daylight film cartridges will cause notch sensing member 21 to rotate in a counterclockwise direction thereby removing light balancing lens filter 26 from optical alignment with taking lens 10. Inserting an artificial light attachment or key 35 will have no effect on photocell sensitivity, filter 25 being normally positioned out of alignment with photocell 11, nor will it affect the spectral transmission of lens 10, filter 26 having been tipped out of alignment with lens 10 by notch sensor 21. Thus photocell sensitivity remains constant, regardless of the source of illumination, when daylight film is used.

When cartridge 12 is coded for A.S.A. 160 Type A film, notch 15 will be present thereby permitting lens filter 26 to remain optically aligned with lens 10, and notch 14 will be of a length which is indicative of an A.S.A. film speed 100, the correct setting for A.S.A. 160 Type A film exposed in daylight through a Type A lens filter 26. When notch 14 is of a length indicative of A.S.A. 100 film speed, only notch feeler member 22a will be permitted to enter therein. Thus, upon movement of cartridge 12 into the camera cartridge chamber, notch sensor 23 is deflected in a clockwise direction about shaft 33. Filter mount 49, under the force of spring 51, will follow the movement of notch sensor 23 and will come to rest in engagement with ear 23b of notch sensor 23. By this arrangement the Type A photocell compensating filter 25 will be moved into optical alignment with photocell 11 and, at the same time, photocell compensating filter 24 will be retained out of optical alignment therewith. Inserting an artificial light attachment or key 35 will simultaneously remove the Type A lens filter 26 and photocell compensating filter 25, as required for proper exposure of A.S.A. 160 Type A film in artificial light. When A.S.A. 100 daylight film is contained by cartridge 12, notch 14 will, of course, be of a length indicative of A.S.A. 100, thereby moving only photocell compensating filter 25 into optical alignment with photocell 11. The absence of notch 15 in daylight film cartridges causes lens filter 26 to be automatically removed from optical alignment with lens 10. The Type A photocell compensating filter 25 functions as a film speed compensator whenever daylight film of less than maximum speed is employed. It should also be noted that the use of an artificial light attachment 35 with A.S.A. 100 daylight film will remove photocell compensating filter 25 and thereby set the sensitivity of photocell 11 for an incorrect higher film speed of A.S.A. 160. This particular problem is overcome by the mechanism comprising the second embodiment of this invention.

When cartridge 12 contains either A.S.A. 40 Type A film or A.S.A. 25 daylight film the length of notch 14 will be indicative of A.S.A. 25 and will be such as to preclude entrance therein of either notch feeler members 22a or 23a. Thus, as cartridge 12 is inserted into the camera cartridge chamber, both notch sensors will deflected in a clockwise direction abut shaft 33 thereby causing both compensating filters 24 and 25 to be positioned in optical alignment with photocell 11. When both compensating filters are thus aligned, the exposure control system is set for a film speed of 25, this being the correct speed for A.S.A. 25 daylight film and A.S.A. 40 Type A film when the latter is exposed through a Type A filter. Insertion of an artificial light attachment or key 35 will remove the Type A photocell compensating filter 25 (and Type A lens filter 26 if Type A is contained by cartridge 12) thereby setting the camera for a film speed of 40, this being the correct setting for exposure of A.S.A. 40 Type A film in artificial light. Again it should be noticed that the insertion of key 35 when daylight film is used results in an undesired change is photocell sensitivity, in this instance changing the film speed setting from A.S.A. 25 to A.S.A. 40. This particular problem cannot be completely overcome without resorting to a comparitively complex arrangement whereby an additional photocell compensator would be activated so as to reduce photocell sensitivity accordingly. In the second embodiment of this invention, this problem is obviated to some extent by the provision of means for maintaining a constant photocell sensitivity when daylight film is exposed in artificial light.

As is apparent from the description above, the mechanism shown in FIG. 1 provides a means responsive to the film speed notch 14 for eliminating the necessity of manually removing the Type A photocell compensating filter when daylight film of the maximum sensitivity accommodatable by the control system is employed. In accordance with this arrangement such filter is normally positioned out of optical alignment with the photocell and is only moved into alignment therewith when film, other than maximum speed daylight film, is used.

Figure 2:
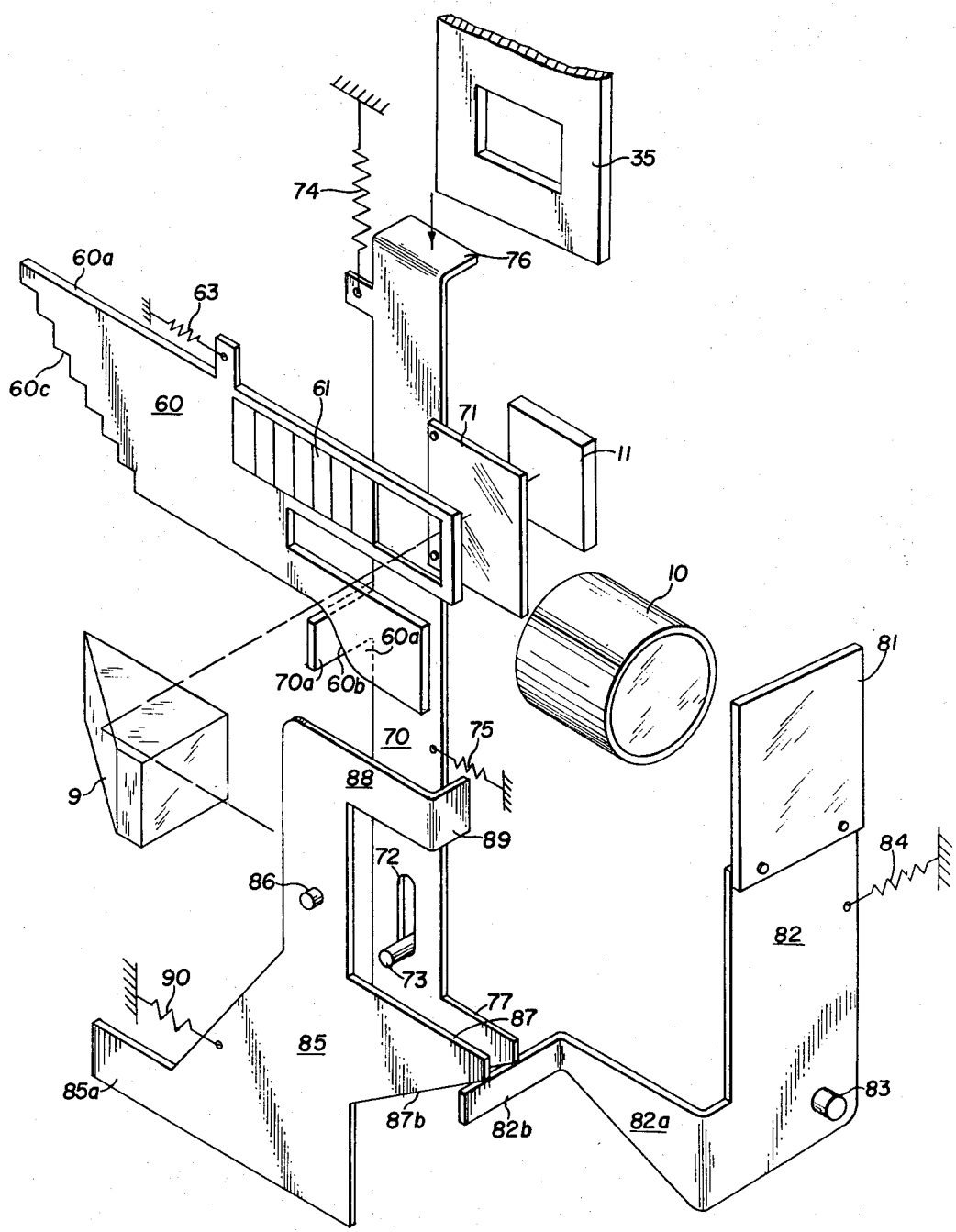
FIG. 2 is an elevational perspective view showing the major elements comprising a second embodiment of the invention.

Referring now to FIG. 2, another embodiment of the present invention is shown incorporated in a system designed to vary photocell sensitivity in accordance with a wide variety of film speeds. The mechanism shown in FIG. 2 is comprised of the same basic elements as those comprising the FIG. 1 embodiment but it is somewhat more sophisticated in that the system cannot only accommodate a much wider range of film speeds, but also has incorporated therein means for preventing the incidental changing of film speed when an artificial light attachment is used with daylight film. A salient feature of the arrangement of FIG. 2 is the interaction between the lower cammed surface 60b of the filter holder 60 and the perpendicularly extending arm 70a of filter holder 70. As will be explained hereinafter, when daylight film of the maximum film speed accommodatable by the exposure control system is used in the camera, the engagement between cam surface 60b and arm 70a will cause a displacement of the Type A photocell compensating filter 71 and thereby permit the photocell 11 to operate at maximum design sensitivity.

As in the FIG. 1 arrangement, the exposure control attenuation system shown in FIG. 2 is basically comprised of 1) means responsive to cartridge notch encoding for varying the spectral transmission of lens 10; 2) means responsive to cartridge notch encoding for varying the position of the photocell compensating filters 61 and 71; and 3) means responsive to the insertion of an artificial light attachment for simultaneously removing from optical alignment with the photocell 11 and taking lens 10 the Type A photocell compensating filter 71 and lens filter 81, respectively. As aforementioned, the system shown in FIG. 2 also includes means for precluding the displacement from optical alignment with photocell 11 of the Type A photocell compensating filter 71 when daylight film is used in combination with an artificial light source.

The means for varying the position of Type A lens filter 81 comprises the Type A notch sensor 85 and lens filter mount 82. Notch sensor 85 is pivotally mounted to the camera housing on shaft 86 and is biased to rotate thereabout in a clockwise direction by spring 90. Notch sensor 85 is provided with a notch feeler member 85a and a horizontally extending triangularly shaped arm 87 having a cam surface 87a on the base portion thereof. Filter holder 82 is pivotally mounted to the camera housing on shaft 83 and is biased to rotate in a clockwise direction thereabout by spring 84. Filter holder 82 is provided with a perpendicularly extending member 82a having extending therefrom in a perpendicular direction arm 82b which operably engages cam surface 87b of notch sensor 85.

Photocell compensation in accordance with film sensitivity is accomplished, as in FIG. 1, by the interposition of filters 61 and 71 between photocell 11 and light pipe 9. Photocell compensating filter 61 is of the variable density type and is integrally connected to the filter holder 60. Filter holder 60 is provided with a film speed notch sensor portion of substantially triangular configuration having a planar edge 60a along one side and another edge 60c angled relative to the planar edge. The angled edge 60c is shaped as a plurality of steps with each step designed to change the exposure control system one third of an f/stop or its equivalent in film speed. Filter holder 60 is slidably mounted to the camera housing and is biased by means of spring 63 in a direction toward camera film cartridge chamber. By this arrangement the stepped notch sensor 60c will engage the film speed cartridge notch 14 to an extent dependent upon the speed of the film and thereby vary the position of variable density filter 61 which, in turn, will vary accordingly the sensitivity of photocell 11. Filter mount 60 is further provided with lower arm 60a, which has a cam surface 60b formed in the base portion thereof. The Type A photocell compensating filter 71 is supported by filter mount 70, which is provided with a perpendicularly extending member 70a which cam surface 60b is seated Filter mount 70 is slidably and pivotally mounted to the camera housing by means of the engagement between slot 72 formed in the filter holder and shaft 73. Further, filter holder 70 is biased to move in an upward and clockwise direction about shaft 73 by springs 74 and 75, respectively. Stop means, comprising the bottom surface of slot 72 and arm 82b of filter mount 82, are provided for normally positioning filter 71 in optical alignment with photocell 11. Thus, when a cartridge containing film of the maximum speed for which the exposure control system is designed is inserted in the camera cartridge chamber, all steps of notch sensor 63 will enter film speed cartridge notch 14 and thereby cause filter holder 70 to move in a downward direction against the force of spring 74 due to the interaction of cam surface 60b and arm 70a. In this manner, all filters are automatically removed from optical alignment with photocell 11 thereby permitting the photocell to operate at maximum sensitivity. In FIG. 2, the elements are in positions so as to adjust exposure parameters for maximum speed Type A film which is to be exposed in sunlight.

The simultaneous displacement from optical alignment with photocell 11 and taking lens 10 of the Type A photocell compensating filter 71 and lens filter 81, respectively, is a accomplished by an interaction between tungsten illumination key 35 and filter mounts 70 and 82. The upper portion of filter mount 70 is bent to form a flat surface 76 which is positioned in the camera receptacle adapted to receive an artificial light attachment or key 35. The lowermost portion of filter mount 70 terminates in a horizontally extending arm 77. Arm 82b of filter holder 82 engages the bottom surface of arm 77 due to the force exerted by spring 84 on filter holder 82. Thus, when an artificial light attachment of light key 35 is inserted in the camera, the bottom surface of such attachment or key will engage surface 67 thereby forcing filter holder 70 in a downward direction against the force of spring 74. The downward movement of filter holder 70 causes photocell compensating filter 71 to be displaced from optical alignment with photocell 11. At the same time, arm 77 engages arm 82b thereby imparting a counterclockwise movement of filter holder 82 about shaft 82 and against the force of spring 84.

To present the incidental changing of photocell sensitivity when daylight balanced film is used in conjunction with an artificial light source, it is necessary to provide a means for enabling filter 71 to remain in alignment with photocell 11 when an artificial light source is mounted to the camera. Relative to the arrangement shown in FIG. 2, it is necessary to laterally displace flat surface 76 of filter mount 70 to such an extent that light key 35 will not come into engagement therewith when the latter is inserted in the artificial light attachment receptacle of the camera, and, at the same time, maintain the optical alignment between filter 71 and photocell 11. Means for accomplishing this end comprise arm 88 formed on notch sensor 85 and lug 89 in which arm 88 terminates, As aforementioned, filter mount 70 is slidably and pivotally mounted on shaft 73. Springs 74 and 75 serve to bias filter holder in an upward and clockwise direction, respectively, on and about shaft 73. The extent of upward movement is controlled by the length of slot 72; the extent of clockwise movement is controlled by the relative sensor 89 which, in turn, is controlled by the position of lug 89 which, in turn, is controlled by the position of notch sensor 85. Thus, when daylight balanced film is used, cartridge 12 imparts a counterclockwise movement in notch sensor 85, the extent of which is governed by the distance cartridge 12 moves in the camera cartridge chamber after contacting notch feeler 85a. As sensor 85 rotates, a similar counterclockwise rotation of filter holder 70 is urged due to the engagement of lug 89 with the side of holder 70. By this arrangement flat surface 76 is a removed from the artificial light attachment receptacle and optical alignment of filter 71 and photocell 11 is maintained. The size of filter 71 is, of course, such that optical alignment can be maintained despite the lateral movement of the filter.

Figure 3:
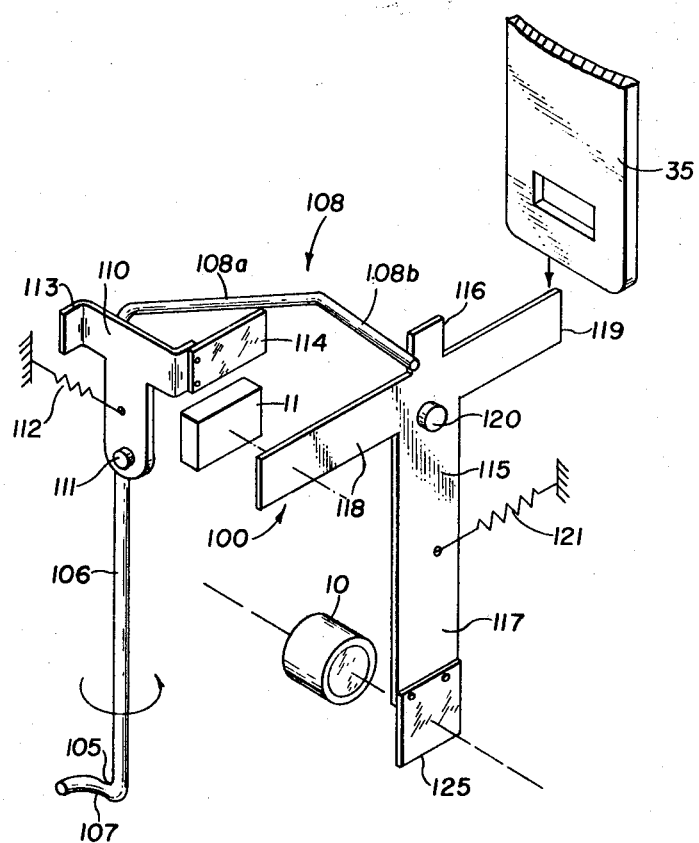
FIG. 3 is an elevational perspective view showing the major elements comprising a third embodiment of the invention.

Referring now to FIG. 3, an extremely simple mechanism for varying photocell sensitivity in accordance with information supplied by film cartridge notch encoding is provided. This particular mechanism is adapted to accommodate two different film speeds (e.g. Type A or daylight). The most significant difference between the embodiment depicted in FIG. 3 and those embodiments depicted in FIGS. 1 and 2 is that the position of the Type A photocell compensating filter 100 is varied by the Type A notch sensor 105 rather than the the film speed notch sensor 110.

In accordance with the embodiment of FIG. 3, the Type A notch sensor 105 is comprised of vertical torsion bar 106 which is biased go rotate in the direction indicated by the arrow and has, extending in a perpendicular direction from the base portion thereof, an arcuate notch feeler 107 which is adapted to cooperate with film cartridge notch 15. The upper end of torsion bar 106 terminates in perpendicularly extending arm 108 comprising an intermediate portion 108 a and an end portion 108b, the latter portion being diaposed at an angle to the intermediate portion. Arm 108 is arranged so as to engage the upper extension 116 of the cross-shaped filter holder 115. Filter mount 115 is pivotally mounted to the camera housing on shaft 120 and is biased by spring 121 to rotate thereabout it a counterclockwise direction. The lower extension 117 of filter mount 115 supports the Type A lens filter 125 and the extension 118 is arranged so as to be movable into and out of partial alignment with photocell 11 as filter mount 115 pivots about shaft 120. Thus, when daylight film is used, (i.e. when notch 15 is absent) notch feeler 107 will be deflected thereby imparting a clockwise rotation to torsion bar 106. The clockwise rotation of torsion bar 107 causes arm 108b to disengage upper extension 116 of filter mount 115 and thereby permits the latter to pivot in a clockwise direction about shaft 120. By this arrangement both Type A compensators, 100 and 125 will automatically be removed from alignment with photocell 11 and lens 10, respectively, whenever daylight film is employed. When Type A film is used in the camera, notch 15 will be present and the elements of the system will remain in position shown. Removal of filters 100 and 125 for exposing Type A film in artificial light is accomplished automatically by the insertion of the artificial light key 35, the latter engaging the upper surface of the right extension 119 of filter holder 115 so as to cause the latter to rotate in a clockwise direction about shaft 120.

The film speed notch sensor 110 is pivotally mounted to the camera housing on shaft 111 and is biased to rotate thereabout in a counterclockwise direction by spring 112. Film speed notch sensor 110 is provided with a notch feeler 113 which is adapted to cooperate with cartridge notch 14. Photocell compensating filter 114 is integrally connected to notch sensor 110 and is arranged so as to be out of optical alignment with photocell 11 when notch feeler 113 engages notch 14. When cartridge 12 contains film of the lower film speed, notch 14 will be absent, thereby causing notch sensor 110 to be deflected in a clockwise direction about shaft 111 so as to position filter 114 in alignment with photocell 11 for reducing photocell sensitivity.

As can be seen from the above descriptions, the invention herein provides a means for automatically removing all photocell compensating filters when daylight film of the maximum sensitivity for which the exposure control system is designed is employed. By the simple step of inserting a film cartridge in the camera, all necessary photocell compensation for varying photocell sensitivity in accordance with film sensitivity is automatically accomplished.

It is to be understood that although the invention has been described primarily with respect to color film, black and white film which is supplied in cartridges usually having no Type A notch may be used with the system of the invention.

Although the invention has been described in considerable detail with reference to certain preferred embodiment thereof, it will be understood that modifications and variations can be effected without departing form the spirit and scope of the invention as described hereinabove and as defined in the appended claims.

I claim:

1. A camera adapted to receive a cartridge containing a strip of photographic film adapted to be exposed in an exposure plane and means for exposing the film strip to scene luminance when the film strip is positioned in such plane, said cartridge having tactile discontinuities thereon representative of film speed and film type respectively, said camera comprising:
   a. a housing;
   b. exposure control means for adjusting the means for exposing the film strip to provide proper exposure of the film for a specific range of scene luminances and film speeds,
   c. a photocell within said housing for regulating said exposure control means as a function of scene illumination, said photocell being electrically coupled to said exposure control means, said photocell having a given sensitivity;
   d. a first compensating filter movable into and out of optical alignment with said photocell so as to vary the effective sensitivity of said photocell in accordance with the film speed represented by one of said tactile discontinuities;
   e. a second compensating filter normally aligned with said photocell and movable from alignment with said photocell when film spectrally balanced for artificial illumination is to be utilized under artificial lighting conditions; and
   f. means, responsive to the film speed discontinuity on the cartridge, for positioning said second photocell compensating filter out of optical alignment with said photocell when said film speed discontinuity is representative of film of the maximum speed in said range accommodatable by said exposure control system.

2. The invention in accordance with claim 1 wherein said positioning means comprises a filter mount having connected therewith a film speed discontinuity sensing member and first spring means for biasing said discontinuity sensing member toward said discontinuity for engagement therewith.

3. The invention in accordance with claim 2 wherein said film speed discontinuity sensing member comprises a feeler member of a size adapted to engage the discontinuity when the dimensions thereof represent film of the maximum speed accommodatable by the camera, whereby said second compensating filter is positionable out of optical alignment with said photocell.

4. The invention in accordance with claim 2 wherein said filter mount moving means comprises a substantially perpendicularly extending lug.

5. The invention in accordance with claim 2 wherein said filter mount is movably mounted on said camera housing and biased into optical alignment with said photocell when said film discontinuity sensing member senses other than film of maximum speed accommodatable by said exposure control system.

6. The invention in accordance with claim 5 wherein said filter mount has an arm extending therefrom and said filter holder moving means comprises a cam surface formed on said film speed discontinuity sensing member, said surface being arranged so as to interact with said arm.

7. An exposure control system in a camera adapted to receive a cartridge containing photographic film for exposing the film to scene illumination, said cartridge having tactile indicia representative of film speed and film type, said exposure control comprising:
  a. means including a photocell for adjusting an exposure parameter in accordance with the level of illumination incident on the photocell;
  b. a first optical filter selectively movable into alignment with said photocell to vary the color balance of light incident on the photocell;
  c. first sensing means for controlling the movement of said first filter in accordance with the tactile indicia on such a cartridge loaded in the camera;
  d. a second optical filter selectively movable into alignment with the objective lens on said camera to vary the color balance of light transmitted through the objective; and
  e. second sensing means for controlling the movement of said second filter in accordance with the tactile indicia on a cartridge loaded in the camera.

8. The exposure control claimed in claims 7 further comprising independent control means for selectively moving said first and second filters out of alignment with said photocell and objective, respectively, regardless of the indicia on a cartridge loaded in the camera.

9. An exposure control system in a camera adapted to receive a cartridge containing photographic film for exposing the film to scene illumination, said cartridge having tactile indicia representative of film speed and film type, said exposure control comprising:
  a. means including a photocell for adjusting an exposure parameter in accordance with the level of illumination incident on the photocell
  b. first means for sensing said tactile indicia to determine the film speed indicated thereby;
  c. second means for sensing said tactile indicia for determining the film type indicated thereby; and
  d. means for coupling together said sensing means when said first sensing means detects that the film speed is the fastest for which the exposure control is designed to operate.